United States Patent [19]
Aaen

[11] 3,945,451
[45] Mar. 23, 1976

[54] SNOWMOBILE TRACK SUSPENSION WITH VARIABLE LOAD TRANSFER CHARACTERISTICS

[75] Inventor: Olav Aaen, Kenosha, Wis.

[73] Assignee: Outboard Marine Corporation, Waukegan, Ill.

[22] Filed: Dec. 9, 1974

[21] Appl. No.: 530,652

[52] U.S. Cl. .................................. 180/9.52; 305/24
[51] Int. Cl.² .......................................... B62D 55/10
[58] Field of Search .................. 180/5 R, 9.5, 9.52; 305/24, 25, 35 R

[56] References Cited
UNITED STATES PATENTS
| | | | |
|---|---|---|---|
| 3,841,717 | 10/1974 | Parisotto | 180/5 R |
| 3,856,099 | 12/1974 | Bowers | 180/5 R |
| 3,866,933 | 2/1975 | Mollring | 180/5 R |

Primary Examiner—Philip Goodman
Assistant Examiner—John A. Carroll
Attorney, Agent, or Firm—Michael, Best & Friedrich

[57] ABSTRACT

Disclosed herein is a snowmobile comprising a drive sprocket mounted on a chassis, a track suspension assembly, a track trained around said sprocket and said track suspension assembly, a rear arm floatably connecting the chassis to the track suspension assembly, a front suspension link pivotally connected to the chassis about an axis fixed with respect to the chassis, a plurality of vertically spaced mounting apertures on the track suspension assembly, and a member selectively pivotally connecting the front link to one of the mounting apertures.

9 Claims, 1 Drawing Figure

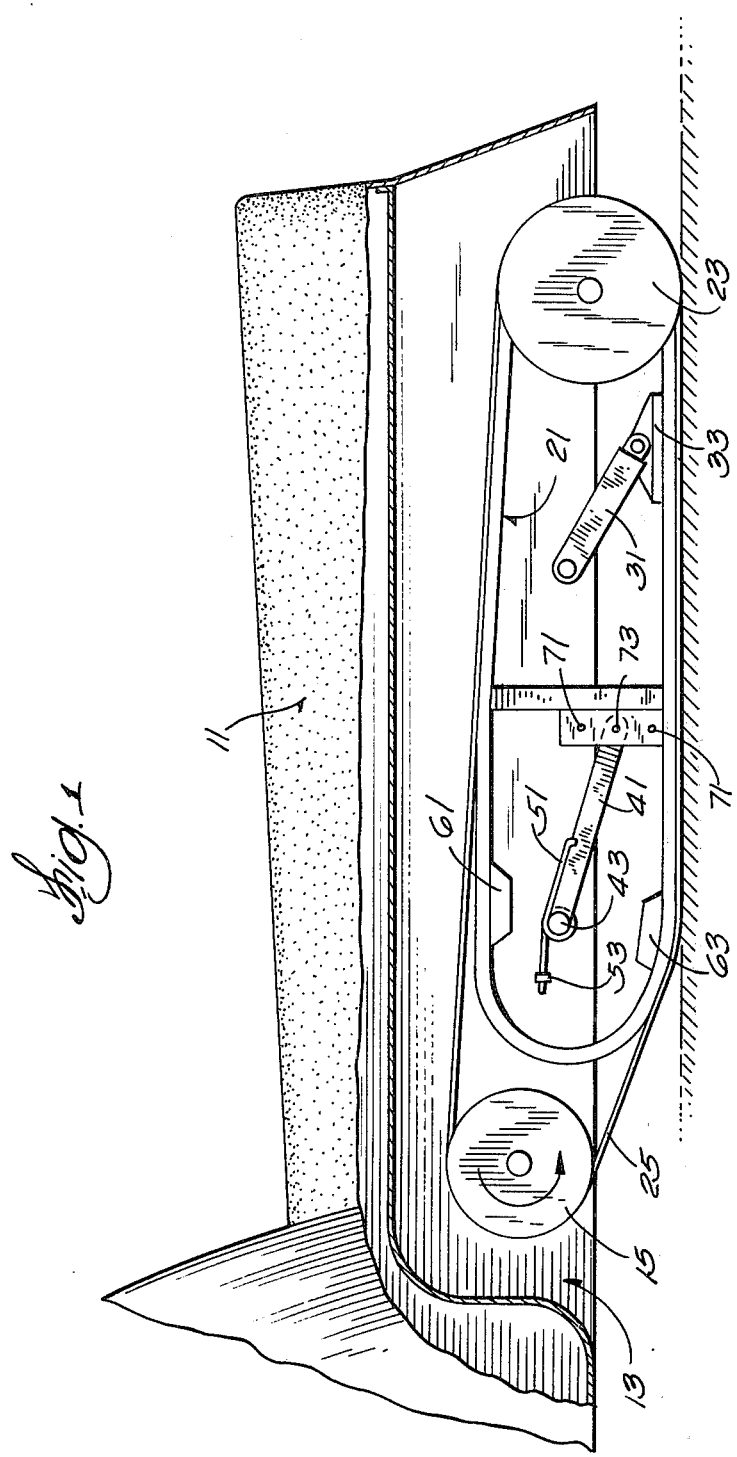

SNOWMOBILE TRACK SUSPENSION WITH VARIABLE LOAD TRANSFER CHARACTERISTICS

BACKGROUND OF THE INVENTION

The invention relates generally to snowmobiles, and more particularly, the invention relates to arrangements for movably mounting a track suspension assembly from a snowmobile chassis. Examples of prior arrangements for mounting track suspension assemblies from a snowmobile chassis are disclosed in the Brandli U.S. Pat. No. 3,613,811, issued Oct. 19, 1971, and in the Skime U.S. Pat. No. 3,609,394, issued Sept. 12, 1972, and in the Swenson U.S. Pat. No. 3,485,312, issued Dec. 23, 1969.

SUMMARY OF THE INVENTION

The invention provides a snowmobile including a track trained around a drive sprocket mounted on a chassis and around a track suspension assembly. In addition, the snowmobile comprises rear arm means for floatably connecting the chassis to the track suspension assembly, a forward link pivotally connected to the chassis about an axis fixed with respect to the chassis, a plurality of vertically spaced mounting means on the track suspension assembly, and means selectively pivotally connecting the forward link to one of the mounting means on the track suspension assembly.

The arrangement thus provided advantageously permits change in the angle of the front suspension link to the chassis without affecting the permissible range of movement of the track suspension assembly relative to the chassis.

In accordance with a preferred embodiment of the invention, the plurality of mounting means are vertically arranged on the track suspension assembly in a forwardly concave arc having a uniform radius from the pivotal connection of the link to the chassis.

Also in a preferred embodiment, the rear arm means is rearwardly located, is pivotally connected at one end to one of the chassis and the track suspension assembly, and is floatably connected at the other end to the other of the chassis and the track suspension.

Still further in accordance with a preferred embodiment of the invention, the floatable connection of the other end of the rear arm means to the other of the chassis and the track suspension assembly includes means for affording pivotal and translatory movement of the rear arm means relative to the other of the chassis and the track suspension assembly.

One of the principal features of the invention is the provision in a snowmobile of means for changing the angle relative to the chassis of the front track suspension assembly supporting link without affecting the range of movement of the track suspension assembly relative to the chassis.

Another of the principal features of the invention is the provision in a snowmobile of means for selectively and variably connecting a front supporting link to a track suspension assembly so as to vary the angle of the front link to the chassis without affecting the permissible range of movement of the track suspension assembly relative to the chassis.

Another of the principal features of the invention is the provision of a connecting means which is referred to in the preceding paragraph, which is economical to construct, and which will provide reliable service over a long and useful life.

Other features and advantages of the invention will become known by reference to the following drawings, general description, and accompanying claims.

THE DRAWINGS

FIG. 1 is a schematic, side elevational view of a snowmobile embodying various of the features of the invention.

Before explaining the invention in detail, it is to be understood that the invention is not limited in its application to the details of construction and the arrangements of the components set forth in the following description or illustrated in the drawing. The invention is capable of other embodiments and of being practiced and carried out in various ways. Also, it is to be understood that the phraseology and terminology employed herein is for the purposes of description and should not be regarded as limiting.

GENERAL DESCRIPTION

Shown in the drawings is a snowmobile 11 including a chassis or frame 13 which can be of any suitable construction and which rotatably supports a forwardly located drive sprocket 15.

Located below the chassis 13 is a track suspension frame or assembly 21 which can be of any suitable construction and which, adjacent the rearward end thereof, includes one or more idler wheels 23.

Trained around the drive sprocket 15 and around the track suspension assembly 21, including a rear idler wheel 23, is an endless snowmobile track 25 which can be of any suitable construction and which is generally of fixed length.

Means are provided for movably supporting the track suspension assembly 21 from the chassis 13, for biasing the track suspension assembly 21 away from the chassis 13, and for establishing limits to the range of movement of the track suspension assembly 21 relative to the chassis 13.

The means for movably supporting the track suspension assembly 21 from the chassis 13 includes rearwardly located arm means for floatably connecting the chassis 13 and the track suspension assembly 21. Any suitable construction can be employed. In the illustrated construction, such means comprises one or more laterally adjacent links or arms which, in effect, constitute a single rear arm 31. Adjacent one end, the rear arm 31 is pivotally connect to the chassis 13, and extends downwardly and rearwardly therefrom, and, adjacent the other end, is floatably connected to the track suspension assembly 21 so as to afford pivotal and translatory movement of the arm 31 relative to the track suspension assembly 21.

Still more specifically, in the illustrated construction, the lower end of the arm 31 is pivotally connected to a bracket 33 which is slidable lengthwise of the track suspension assembly 31 as shown in greater detail in application Ser. No. 426,238, filed Dec. 19, 1973. It is within the scope of the invention to pivotally connect the lower end of the arm 31 to the track suspension assembly 21 and to floatably connect the upper end of the arm 31 to the chassis 13. It is also within the scope of the invention for the arm 31 to extend downwardly and forwardly and to be telescopic.

The means movably connecting the track suspension assembly 21 to the chassis 13 further includes one or more laterally adjacent forwardly located levers or arms which, in effect, constitute a single forward link 41. The link 41 extends downwardly and rearwardly, and at one end, i.e., the upper or forward end, is pivotally connected to the chassis 13 about an axis 43 fixed with respect to the chassis and, at the other end, is pivotally connected to the track suspension assembly 21, as will hereinafter be explained in greater detail.

The means for biasing the track suspension assembly 21 away from the chassis 13 can take various forms. In the illustrated construction, such means is shown schematically as a helical coil spring 51 having one end in engagement with an anchor 53 on the chassis 13 and having another end in engagement with the link 41 so as to urge the forward link 41 in the clockwise direction as shown in the drawings.

The means for establishing limits to the travel of the track suspension assembly 21 relative to the chassis 13 includes stop means located on the track suspension assembly 21 for engagement with chassis 13 so as to limit movement of the track suspension assembly 21 relative to the chassis 13. More specifically, the track suspension assembly 21 is provided with an upper stop 61 which limits travel of the track suspension assembly 21 downwardly and away from the chassis 13 upon engagement with the upper mounting of the link 41 to the chassis 13. In addition, the track suspension assembly 21 is provided with a lower stop 63 which limits travel of the track suspension assembly 21 upwardly and toward the chassis 13 when engaged by the mounting of the link 41 to the chassis 13. While the stops 61 and 63 are mounted on the track suspension assembly 21 to engage the mounting of the link 41 to the chassis 13, stops could be mounted in any convenient spot so as to establish the range of permissible movement of the track suspension assembly 21 relative to the chassis 13.

In accordance with the invention, means are provided for varying the disposition of the link 41 relative to the chassis 13 so as to vary the load transfer characteristics of the track suspension assembly 21 without affecting the permitted range of travel of the track suspension assembly 21 relative to the chassis 13. Thus, in the illustrated construction, the track suspension assembly 21 includes means affording selective connection of the lower end of the forward link 41 to the track suspension assembly 21 at vertically spaced locations. While various arrangements could be employed, it is preferred that the means affording selective connection of the forward link 41 to the track suspension assembly 21 be arranged at a common radius from the mounting of the forward link 41 to the chassis 13. Thus, in the specifically illustrated construction, there is provided a series of three vertically spaced apertures 71 which are located at a common radius from the mounting of the forward link 41 to the chassis 13 and which are adapted to selectively receive a cross member 73 which in turn, is pivotally received in a transverse bore at the lower end of the forward link 41. Accordingly, the lower end of the forward link 41 can be selectively connected to the track suspension assembly 21 at differing angles relative to the chassis 13 to vary the angle of attack of the track suspension assembly 21 without affecting the range of permissible travel of the track suspension assembly 21 relative to the chassis 13. Such variation in the angle of the forward link 41 to the chassis 13 can be employed to vary the load transfer characteristics of the track suspension assembly 21 to suit various different operating conditions.

Various of the features of the invention are set forth in the following claims:

What is claimed is:

1. A snowmobile comprising a chassis, a drive sprocket mounted on said chassis, a track suspension assembly, a track trained around said sprocket and said track suspension assembly, rear arm means for floatably connecting said chassis to said track suspension assembly, a forward link having a lower end and having an upper end pivotally connected to said chassis about an axis fixed with respect to said chassis, a plurality of vertically spaced mounting means on said track suspension assembly, and means selectively pivotally connecting said lower end of said link to one of said mounting means.

2. A snowmobile in accordance with claim 1 wherein said plurality of mounting means include a plurality of vertically arranged apertures on said track suspension assembly.

3. A snowmobile in accordance with claim 1 wherein said plurality of mounting means are arranged in a forwardly concave arc having a uniform radius from the pivotal connection of said link to said chassis.

4. A snowmobile in accordance with claim 1 wherein said rear arm means comprises a rearwardly located arm, means pivotally connecting one end of said arm to one of said chassis and said track suspension assembly, and means floatably connecting the other end of said arm to the other of said chassis and said track suspension assembly.

5. A snowmobile in accordance with claim 4 wherein said means floatably connecting the other end of said arm to said other of said chassis and said track suspension assembly includes means for affording pivotal and translatory movement of said arm relative to said other of said chassis and said track suspension assembly.

6. A snowmobile in accordance with claim 1 and further including means for yieldably biasing said track suspension assembly away from said chassis.

7. A snowmobile in accordance with claim 1 and further including stop means for limiting movement of said track suspension assembly relative to said chassis.

8. A snowmobile comprising a chassis, a drive sprocket mounted on said chassis, a track suspension assembly, a track trained around said sprocket and said track suspension assembly, rear arm means for floatably connecting said chassis to said track suspension assembly, a forward link having a lower end and an upper end pivotally connected to said chassis about an axis fixed with respect to said chassis, means for yieldably biasing said track suspension assembly away from said chassis, stop means for limiting the range of movement of said track suspension assembly relative to said chassis, and means on said lower end of said forward link and on said suspension assembly for selectively and variably pivotally connecting said lower end of said forward link to said track suspension assembly without affecting the range of movement of said track suspension assembly relative to said chassis.

9. A snowmobile in accordance with claim 8 wherein said means for pivotally connecting said forward link and said track suspension assembly includes a plurality of vertically spaced mounting means on said track suspension assembly, and means selectively pivotally connecting said link to one of said mounting means.

* * * * *